United States Patent [19]
Dyott et al.

[11] Patent Number: 5,481,358
[45] Date of Patent: Jan. 2, 1996

[54] COIL MOUNTING ARRANGEMENT FOR FIBER OPTIC GYROSCOPE USING A GEL LOADED WITH PARTICLES

[75] Inventors: Richard B. Dyott, Oak Lawn; Eric L. Brooker, Hinsdale; Sidney M. Bennett, Chicago; John D. Myhre, Western Springs, all of Ill.

[73] Assignee: Andrew Corporation, Orland Park, Ill.

[21] Appl. No.: 230,763

[22] Filed: Apr. 21, 1994

Related U.S. Application Data

[63] Continuation-in-part of Ser. No. 174,184, Dec. 27, 1993.

[51] Int. Cl.$^6$ .................................................. G01C 19/64
[52] U.S. Cl. ............................................................ 356/350
[58] Field of Search ................................................ 356/350

[56] References Cited

U.S. PATENT DOCUMENTS

| | | |
|---|---|---|
| 4,669,814 | 6/1987 | Dyott . |
| 4,699,451 | 10/1987 | Mohr ..................................... 356/350 |
| 4,702,599 | 10/1987 | Mohr ..................................... 356/350 |

FOREIGN PATENT DOCUMENTS

| | | |
|---|---|---|
| 0391557 | 10/1990 | European Pat. Off. . |
| 61-217011 | 9/1986 | Japan . |
| 05215559 | 8/1993 | Japan . |
| 05273415 | 10/1993 | Japan . |
| 2146428 | 4/1985 | United Kingdom . |
| WO83/00552 | 2/1983 | WIPO . |
| WO92/08106 | 5/1992 | WIPO . |

OTHER PUBLICATIONS

Kaminow "Polarization in Optical Fibers", IEEE Journal of Quantum Electronics, vol. QE–17, No. 1, Jan. 1981.
Craig et al. "Interlaboratory Comparison of Polarization–Holding Parameter Measurements on High Birefringence Optical Fiber", Nat. Inst. of Standards and Technology (undated).
The Handbook of Epoxy Resins, McGraw Hill, "Setting Properties of Fillers," pp. 14–2–14–11.
Dow Corning®, Q3–6575 Silicone Dielectric Gel "New Product Information" flyer (1984).

*Primary Examiner*—Vincent P. McGraw
*Attorney, Agent, or Firm*—Arnold, White & Durkee

[57] ABSTRACT

The sensing coil of a fiber optic gyroscope is wholly or partially surrounded by a gel. The components attached to the coil, such as the directional coupler(s) and polarizer, may also be wholly or partially submerged in the gel. The gel is contained by a rigid housing, in which the inner walls of the housing form a cavity for the coil and the gel. The cavity is filled with the gel, and the gel may be bonded to the inner walls of the housing. The gel remains stiff enough to maintain the coil in a fixed position relative to the housing, and soft enough to avoid any significant effect on the h of the coil over the operating temperature range. Furthermore, the gel can be loaded with particles to adjust the specific gravity of the gel, to modify the thermal properties of the gel and to increase the viscosity of the gel for improved vibration damping. In a modified form, the optical-fiber sensing coil is positioned on a mounting surface and otherwise surrounded by the gel. Alternatively, the optical fiber sensing coil is wound around a form that has a layer of gel on the coil-supporting surface.

32 Claims, 5 Drawing Sheets

COIL MOUNTING ARRANGEMENT FOR FIBER OPTIC GYROSCOPE USING A GEL LOADED WITH PARTICLES

RELATED PATENT APPLICATIONS

This is a continuation-in-part of U.S. patent application Ser. No. 08/174,184 filed Dec. 27, 1993.

FIELD OF THE INVENTION

The present invention relates generally to fiber optic gyroscopes and, more particularly, to mounting arrangements for the sensing coil and other components in a fiber optic gyroscope.

BACKGROUND OF THE INVENTION

A fiber optic gyroscope measures the rotation of a sensing coil by detecting the Sagnac phase shift between two counter-propagating light waves in the sensing coil.

The mounting of the sensing coil in a fiber optic gyroscope is critical for a number of reasons. Because the gyroscope must be capable of sensing extremely small rotational movements of the coil, the coil should be mounted in a way that isolates the coil from stresses that might cause localized disturbances in the fiber which forms the coil. Such localized disturbances can modify the light wave in a manner that can be mistaken for rotation of the coil. The coil must also remain stable in a fixed position so as to avoid the generation of spurious signals due to movement of the coil relative to the structure on which it is mounted. Moreover, the isolation and fixed position of the coil must usually be maintained over a relatively wide temperature range, e.g., from −55° C. to +85° C.

In interferometric and resonant fiber optic gyroscopes, optical power is injected into both ends of the coil by a directional coupler, and exits the coil through the same directional coupler. The Sagnac ring (coil) in these gyroscopes is often made of single-mode, polarization-maintaining fiber, to ensure that light energy propagates along the length of the coil in the same polarization that it originally had at the directional coupler interface. Polarization maintenance is characterized by the h-parameter.

There also exist Sagnac rings made of single-mode (non-polarization maintaining) fiber where the optical power is de-polarized, typically by a Lyot depolarizer. Since the depolarization is often imperfect, changes in the birefringence of the coil fiber and movement of the coil with respect to its mounting can result in effects analogous to those described for polarization-maintaining fiber coils.

As is well-known in the art, the extinction ratio (ER) of a sensing coil is a measure of the polarization-holding properties of the coil. More specifically, the value of ER is a measure, in decibels (dB), of the ratio of the intensity of an optical signal having the desired polarization and the intensity of an optical signal having polarization that is orthogonal to the desired polarization, after the desired optical signal has been propagated through a given length of optical fiber. The extinction ratio of a coil of length l is related to the h-parameter of the fiber, where h is defined as the extinction ratio per meter of fiber.

Thus $$ER = 10 \log_{10} h + 10 \log_{10} l, \; dB$$

The h-parameter of a fiber is usually measured by determining the extinction ratio of a sample length of fiber, perhaps 100 meters, wound loosely on a large diameter form. Thus the h-parameter can be defined as $$h = \frac{P_{min}}{l_{test} P_{max}}$$

where $l_{test}$ is the length of the test sample and $P_{min}$ and $P_{max}$ are the optical powers measured through the fiber with crossed polarizers and aligned polarizers, respectively. Thus $P_{max}$ represents the wanted signal level, and $P_{min}$ represents the unwanted (cross-polarized) signal level. Alternatively, the h-parameter is expressed in dB-meters, and is defined as $$H = 10 \log_{10} h$$

A typical value of H is −45 dB-m.

The value of the h-parameter is a function of a number of factors such as the fiber construction, the protective (buffer) coating applied over the fiber, and external stresses. When the fiber is wound into a coil, the resultant extinction ratio depends on the length and method of winding of the coil and the method of mounting the coil in the gyroscope. The performance can be described in terms of ER, but it is perhaps better to use h, since coils of differing lengths and diameters are used to achieve specific product specifications. A poor h-parameter value (closer to 1.0) causes gyro drift, which arises from unwanted coupling between the two polarization modes. This coupling is typically random in nature, but can be temperature-dependent.

Degradation of the h-parameter is caused primarily by forces transmitted through the buffer coating to the silica cladding of the fiber. These stresses are applied to the core, and particularly if they are asymmetrical, will produce a change in the birefringence, which is the difference in the propagation constant of the light in each of the two characteristic polarizations. It is believed that the spatial frequency spectrum of the birefringence perturbations having a component at the beat length results in coupling of energy between the two modes. In coils, the undesired stresses and resultant coupling are often most intense where fibers cross each other. In addition, significant temperature dependencies can be caused by changes in the modulus of elasticity of the buffer coating (if it is a plastic-like material) and the differing thermal coefficients of expansion of the buffer and the fiber.

Typically Sagnac ring coils are wound on forms made of metal, plastic, or ceramic material. The objective is to provide a means of holding the coil in place when mounted in the mechanical package for the gyroscope, and to accurately locate the axis of the coil, as the fiber optic gyro is sensitive only to rotations about this axis. The coil form is typically either a cylinder or a flanged reel, and both introduce stresses, particularly as the temperature changes. Even at room temperature, the first layer of the coil often suffers from the forces associated with contact with the form, and the winding tension and pattern can have substantial effects on the h-parameter. Usually the coil form has a higher coefficient of thermal expansion than the fiber in the coil. Consequently, as the temperature increases, the radius of the form increases faster than that of the fiber, thereby increasing the radial pressure on the fiber. This results in a degradation in h. When the temperature decreases, the height of the flanged cylinder decreases, causing the flanges to press against the top and bottom surfaces of the coil. Encapsulation methods employing materials with a high Young's modulus, such as silicone rubber, also apply significant forces to the coil, due to the volumetric change during curing, and as a consequence of differential thermal expansion.

SUMMARY OF THE INVENTION

The primary objective of the present invention is to provide a coil mounting arrangement which overcomes the problems described above by wholly or partially surrounding the coil with a gel. Other components comprising the gyroscope, such as the directional coupler(s) and polarizer, can also be partially or wholly surrounded by the gel. The stiffness or Young's modulus of the gel preferably remains within a desired range over the operating temperature range of the gyroscope. Specifically, the gel should remain stiff enough to maintain the coil in a substantially fixed position relative to the housing which contains the gel, and soft enough to avoid any significant effect on the h of the coil over the operating temperature range.

The gel is preferably contained by a rigid housing in which the inner walls of the housing form a cavity for the coil and the gel. The cavity is preferably filled with the gel, and the gel can be bonded to the inner walls of the housing which form the cavity. Moreover, the housing preferably provides for the differential coefficient of thermal expansion between the gel and the housing in the form of vent holes, relief areas, air bubbles or a diaphragm in order to avoid the build up of hydrostatic forces. If entrained air bubbles are used, they can be incorporated in the gel under high pressure to improve the distribution of air bubbles.

Another objective of the present invention is to provide an improved coil mounting arrangement and method for modifying the thermal properties of the gel to reduce the problems arising from differences in the thermal properties of the gel and the coil housing. Preferably, in the present invention, particles are loaded within the gel to modify the coefficient of thermal expansion of the gel so as to reduce the difference in the coefficient of thermal expansion between the gel and the coil housing. These particles can be either solid or hollow ("microballoons"), with the latter resulting in an improved ability to control the bulk thermal conductivity of the particle-loaded gel.

A further objective of this invention is to provide an improved coil mounting arrangement which enables the adjusting of the specific gravity of the the gel. The gel and the gyro coil can have differing specific gravities and act as a spring-mass system which can have resonant frequencies within the frequency range of normal operating vibrations. Loading the gel with either solid or hollow microspheres or particles can adjust the specific gravity of the gel and the relative specific gravity between the coil and the gel and thereby adjust the resonant frequencies of the coil-gel combination.

A still further objective of the present invention is to provide an improved coil mounting arrangement and method for damping vibrations within the coil housing to reduce the vibrational effects upon the coil. The present invention accomplishes this by increasing the gel viscosity. Loading the gel with particles, preferably made of silica, increases the gel viscosity, thereby improving the vibration damping properties of the gel. Alternatively, the gel can be loaded either with particles of less than one micron in size to increase gel viscosity and thus permit the control of vibration effects or with larger particles to modify the thermal properties for the gel or both.

In a modified form of the invention, the optical-fiber sensing coil rests on a mounting surface in the cavity formed by the housing and is otherwise wholly or partly surrounded by the gel. In another embodiment of the invention, the optical fiber sensing coil is wound around a form that has a layer of gel on the coil-supporting surface. A coating of adhesive is preferably applied to the outside surfaces of the coil to hold the coil windings together in a stable configuration around the layer of gel.

DETAILED DESCRIPTION OF PREFERRED EMBODIMENTS

Figure 1:
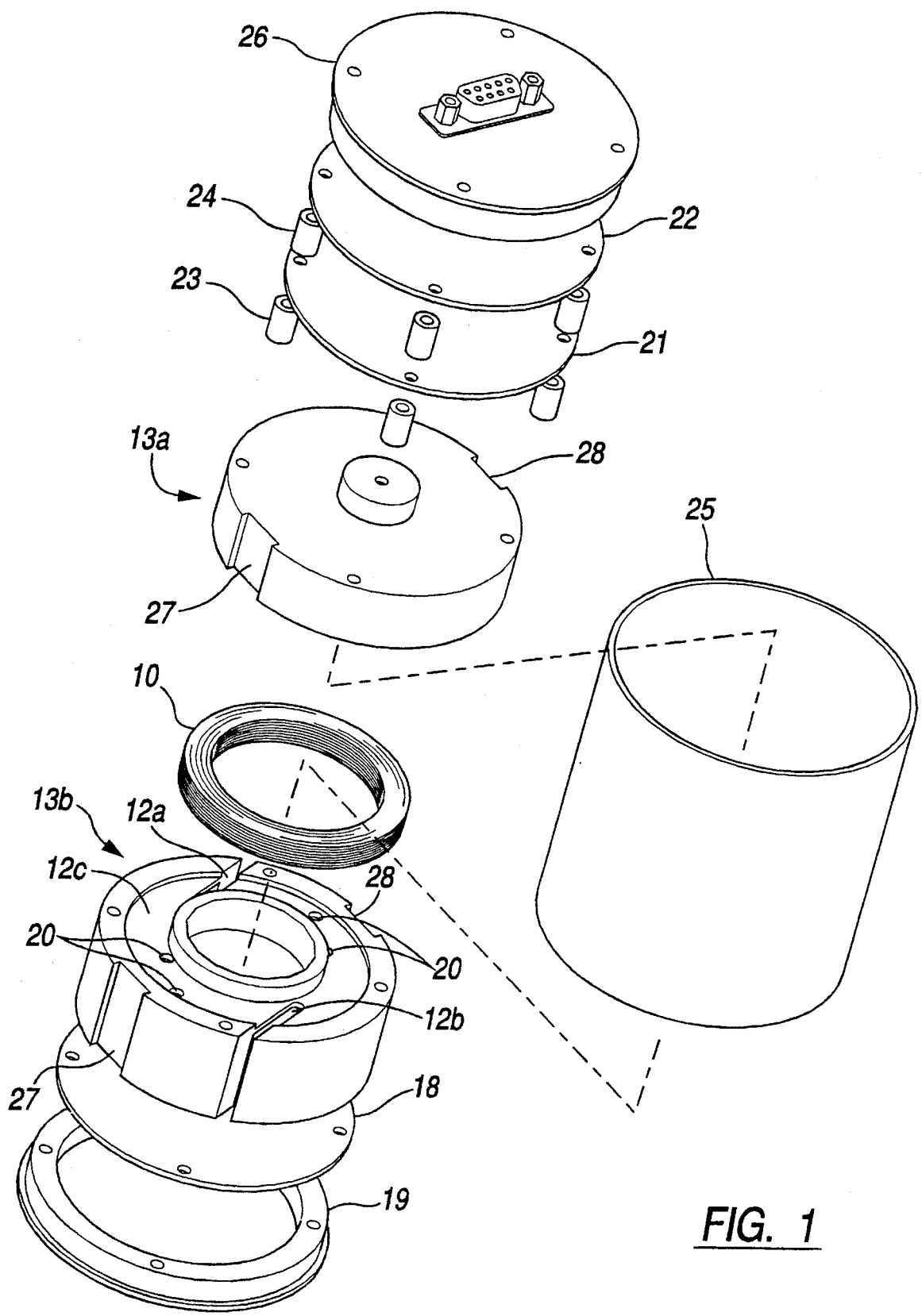
FIG. 1 is an exploded perspective view of a fiber optic gyroscope sensing coil mounted in accordance with the present invention.

While the invention is susceptible to various modifications and alternative forms, specific embodiments thereof have been shown by way of example in the drawings and will be described in detail herein. It should be understood, however, that it is not intended to limit the invention to the particular forms described, but, on the contrary, the intention is to cover all modifications, equivalents and alternatives falling within the spirit and scope of the invention as defined by the appended claims.

Figure 2:
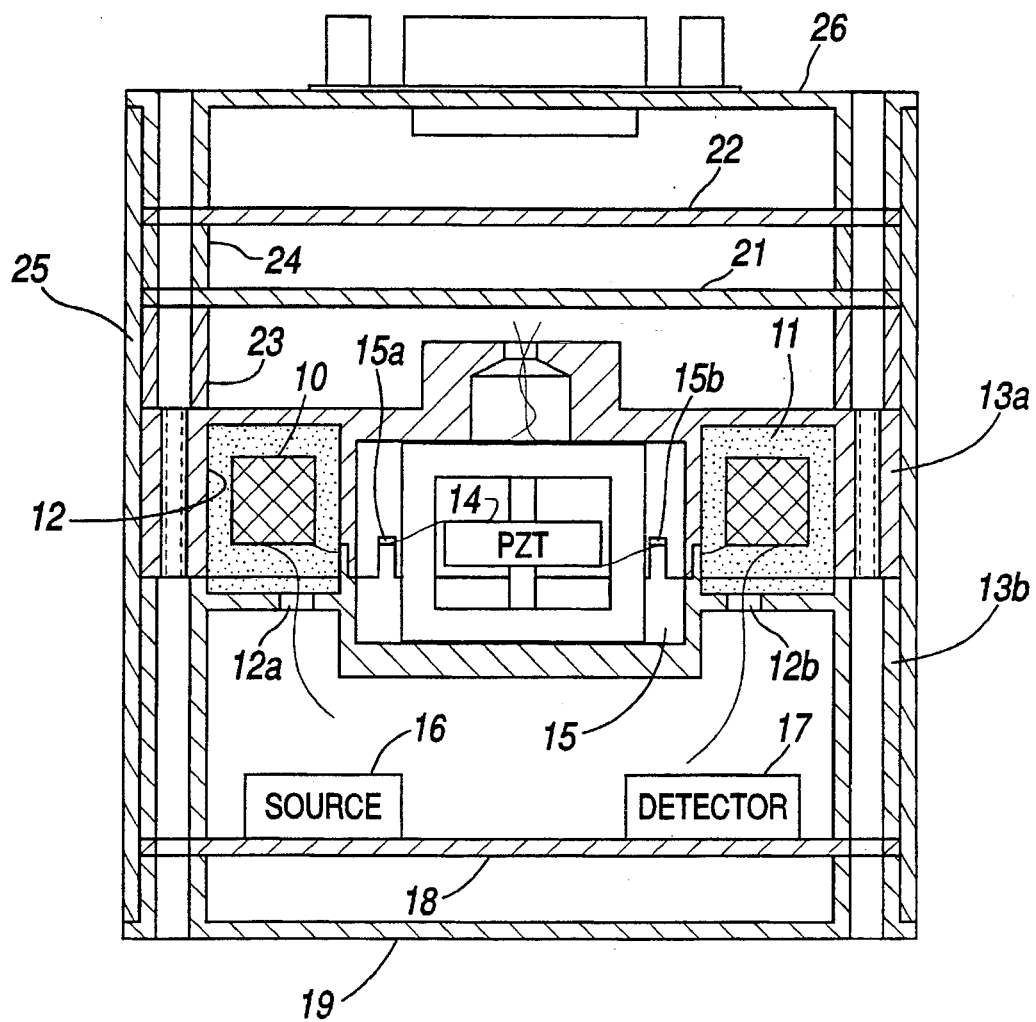
FIG. 2 is an enlarged vertical sectional view of the sensing coil mounting assembly shown in FIG. 1.
Figure 4:
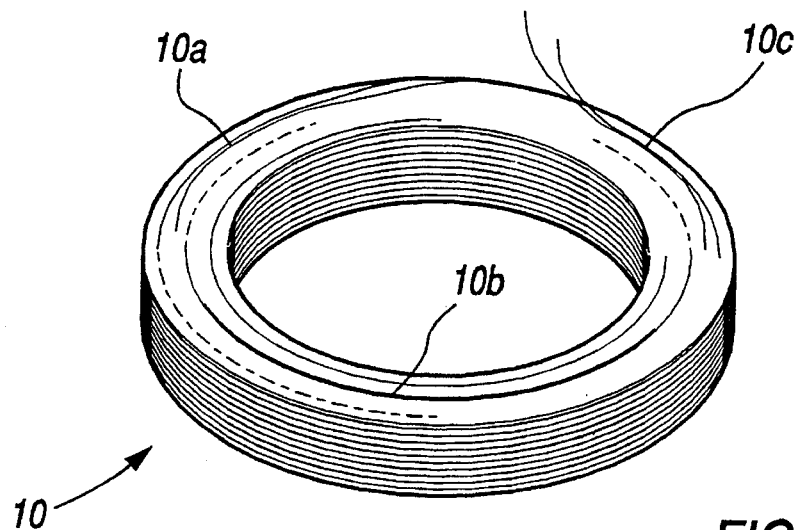
FIG. 4 is an enlarged perspective view of the sensing coil used in the assembly of FIGS. 1–3.

Turning now to the drawings and referring first to FIG. 1 and FIG. 2, a multi-turn coil 10 of optical fiber is disposed within a body of gel 11 contained in an annular cavity 12 formed by an aluminum housing 13. The coil 10 is preferably preformed and connected to a directional coupler 10a (see FIG. 4) connected in series with a polarizer 10b and a second directional coupler 10c. The coil, the directional couplers, and the polarizer are then all submerged within the gel 11 with a length of the fiber at one end of the coil extending through a pair of holes 15a and 15b in the inner wall of the cavity 12 to form part of a piezoelectric phase modulator or PZT 14 mounted within a central cavity 15 formed by the housing 13. The two fibers at the end of the directional coupler most distal from the coil extend downwardly through a pair of slots 12a and 12b in the bottom wall of the cavity 12 for connection to a laser 16 and a photodetector 17 mounted on a printed circuit board (PCB) 18. The PCB 18 is attached to the lower portion of the housing 13 by a bottom plate 19 and a plurality of screws. Two additional PCBs 21 and 22 mounted above the housing 13 contain the power supply and signal processing circuitry for the gyroscope. The PCBs 21 and 22 are spaced from each other and from the housing 13 by two sets of spacer posts 23 and 24. All these elements are nested inside a protective cylinder 25 along with the housing 13 and the PCB 18, and then a top plate 26 closes the end of the cylinder 25. A plurality of screws are passed through the top plate 26, the two PCBs 21 and 22 and the spacer posts 23 and 24, and are threaded into the housing 13. Channels 27 and 28 in the outer wall of the housing accommodate a wiring harness (not shown) for interconnecting the various PCBs.

To protect the optical fiber from forces exerted by acceleration and vibrations on the leads extending from the housing 13 to the laser 16 and the photodetector 17, the space between the PCB 18 and the bottom of the cavity 12 is preferably filled with the same gel used in the cavity 12. This additional gel holds the leads in stable positions between the cavity 12 and the PCB 18.

The optical fiber for forming the coil 10 is single-moded and preferably polarization-holding, such as a fiber having an elliptical polarization-maintaining core or the D-shaped fiber described in Dyott U.S. Pat. No. 4,669,814. Alternatively, stress-induced birefringent or high-numerical-aperture single-mode fiber may be used. The fiber preferably has a polymeric buffer coating on it, although other types of protective coatings may be employed if desired, such as indium coated fiber.

Figure 3C:
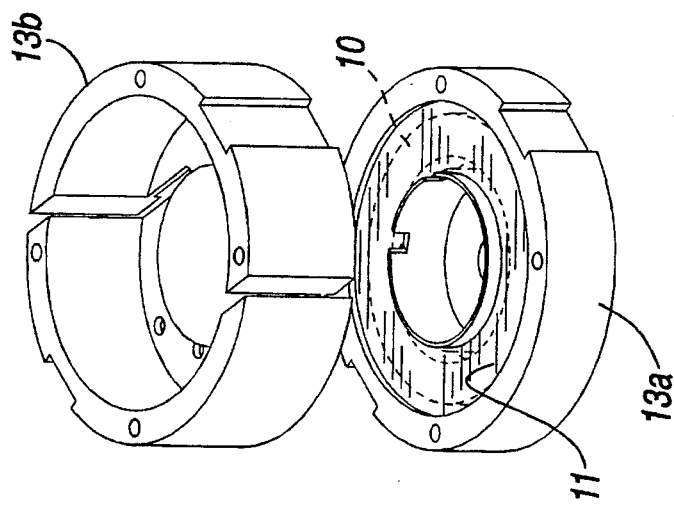
FIGS. 3a–3d are perspective views of certain of the elements shown in FIGS. 1 and 2, illustrating sequential stages in the assembly thereof.
Figure 3B:
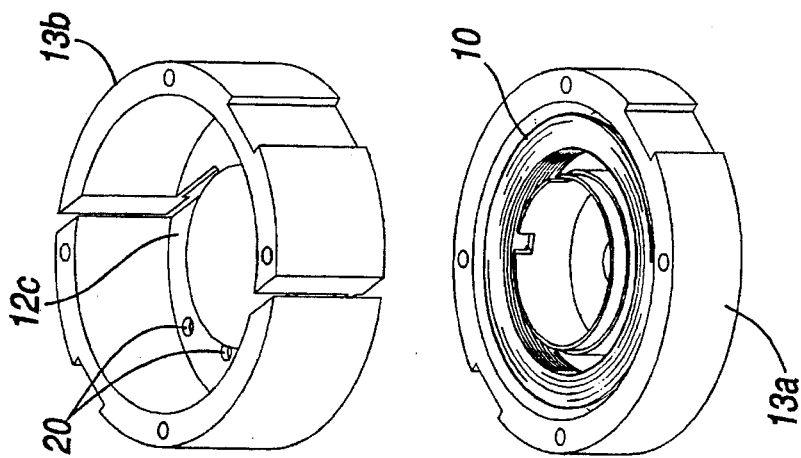
Figure 3A:
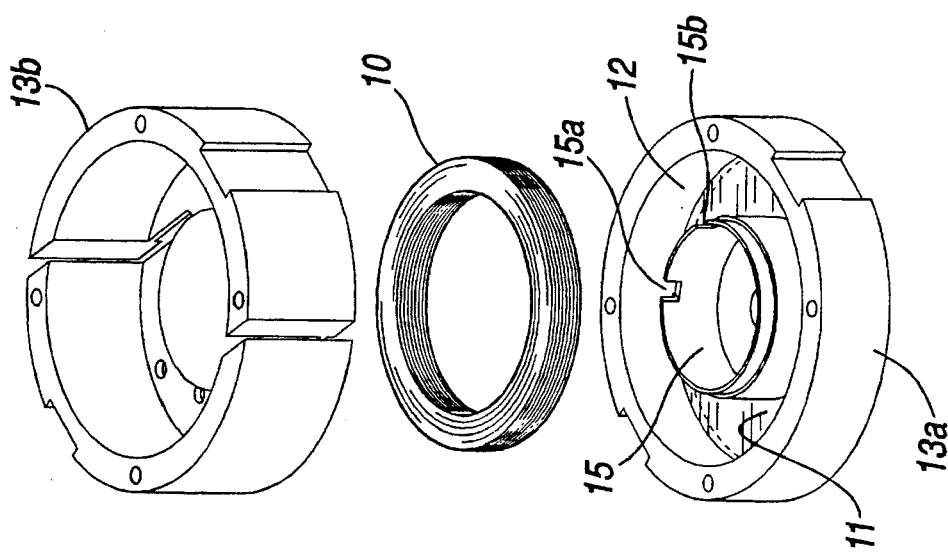
Figure 3D:
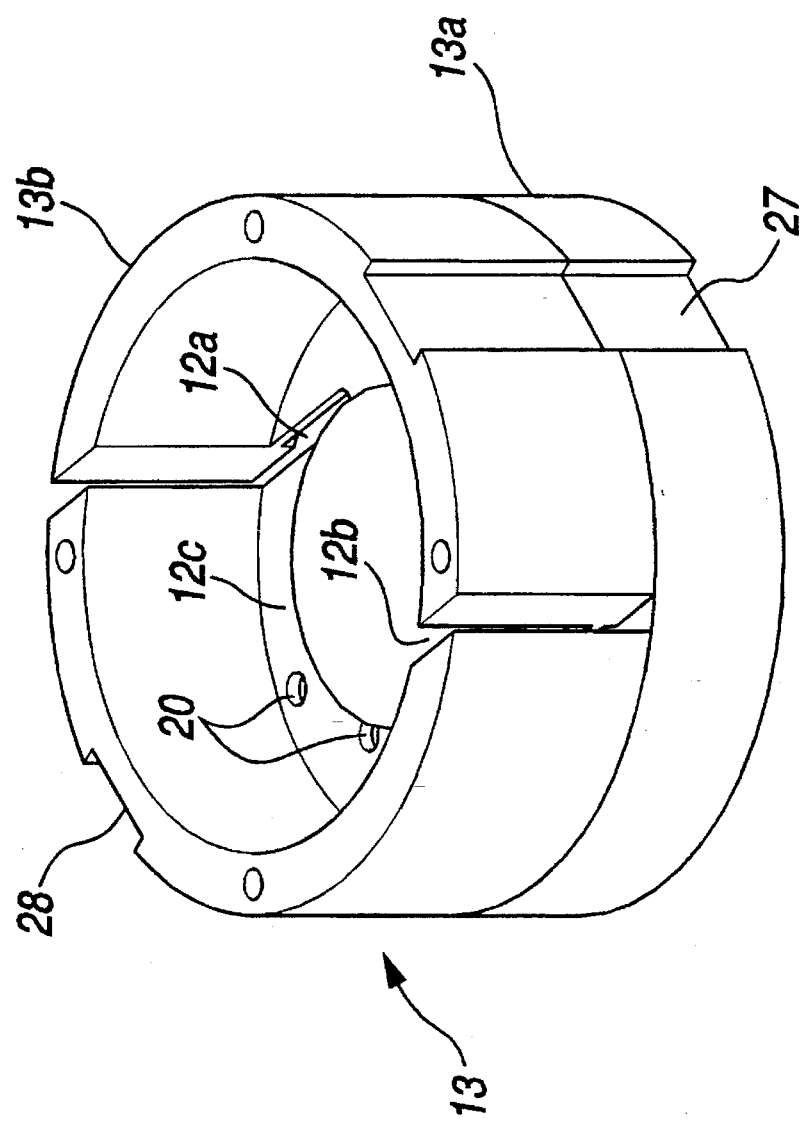

In the illustrated embodiment, the body of the optical fiber coil 10 contacts only the gel 11, and thus is supported within the housing 13 solely by the gel 11. As shown in FIG. 3a, the gel is initially formed as a layer on the bottom wall of the cavity 12, while that bottom wall is held in a perfectly horizontal position. The upper surface of the gel layer is then perfectly level and horizontal, as is the coil 10 when it is placed on top of the gel layer. Alternatively, the coil can be placed on a mounting surface. As such, the mounting surface could replace the initial layer of gel or be placed on top of the initial layer of gel. In the illustrated embodiment, the housing 13 is made in two parts 13a and 13b to facilitate placement of the coil within the housing and the gel contained therein.

After the coil 10 has been placed on the bedding layer of gel in the housing part 13a, the second housing part 13b is attached to the first part, and then the rest of the cavity 12 is filled with additional gel though one of the expansion holes 20 described below. The additional gel envelopes the coil 10 and forms a unitary gelatinous mass with the bedding layer of gel. The entire mass of gel preferably bonds to the inside walls of the cavity 12 as the gel solidifies. Thus the fiber coil 10 and its attached components (the directional couplers and the polarizer) are ultimately submerged completely within the gel 11, with the two free ends of the fibers forming the distal coupler exiting the gel through the slots 12a and 12b in the bottom wall of the cavity 12.

The fiber that forms the coil 10 is preferably coated with an oil or other lubricant to facilitate sliding movement of adjacent windings over each other as the coil relaxes after winding.

The stiffness or Young's modulus of the gel is sufficiently great to support the coil 10 in a fixed position within the housing 12. That is, the coil will not migrate in any direction, either rotationally, axially, or radially, within the mass of the gel. This fixed position of the coil must be maintained over the desired range of operating temperatures, which is typically from about −55° C. to about +85° C. The temperature at which a gel solidifies or changes to a brittle vitreous state is referred to as the glass transition temperature. For the purposes of this invention, the glass transition temperature should be below the operating temperature range of the gyroscope.

To accommodate expansion and contraction of the gel with changing temperature, one or more walls of the cavity 12 are preferably provided with recesses into which the gel may expand without subjecting the coil 10 to significant pressure changes. In the illustrated embodiment, the recesses are formed by a plurality of holes 20 in the cavity wall 12c.

The effect of the holes 20 is to accommodate the change in volume of the gel 11 over the operating temperature range of the gyroscope, so that the gel expands and contracts through the holes 20 rather than significantly changing the pressure on the coil 10. As an alternative to the holes 20, the cavity walls can be formed in part of a flexible material, or the upper surface can be grooved. Another alternative is to embed one or more resilient compressible elements within the gel 11. For example, air bubbles may also be entrained in the gel.

If desired, the specific gravity of the gel 11 can be adjusted to approximate that of the coil 10. The coil typically has an effective specific gravity greater or less than 1.0, whereas the gel may have a specific gravity of about 1.0. The difference in the specific gravities can cause the coil-gel combination to act as a spring-mass system, which can result in spurious output signals from the gyroscope if the spring-mass system has resonant frequencies within the frequency range of a vibratory input. To avoid this problem, the gel may be loaded with solid or hollow silica microspheres or particles to reduce the difference between the specific gravities of the gel and the coil and thereby adjust the resonant frequencies of the coil-gel combination. The loading of the gel also increases the viscosity and stiffness of the gel.

A coil of single-mode, polarization-holding optical fiber was tested while resting on a solid surface in air, and then while submerged in Dow Corning Q3-6575 silicone dielectric gel. The coil tested had a length of 250 meters. In each case the signal levels in the wanted and unwanted polarizations were measured at temperatures ranging from 85° C. to −55° C., and the extinction ratio ER was calculated. The extinction ratio ER of the coil varied from −25 to −19.2 dB in air, and from −24.5 to −19.5 dB in the gel. The same experiment was performed with a 150 meter coil submerged in gel loaded with 40% by volume of silica particles, resulting in extinction ratios of −19.3 dB and −16.0 dB at the high and low temperature limits, respectively. The two experiments are not directly comparable as different fiber types were used; the significant fact is that the variation over temperature is small.

As the above observations suggest, the mounting arrangement and method of mounting the coil in gel yields excellent results in preserving the fiber h. As discussed, the present invention includes provisions for allowing the gel to expand so that the coil does not experience pressure, such as relief areas in the top surface plate, diaphragms, and air sacks. In addition, an arrangement and method was described of adjusting the specific gravity of the gel to equal that of the coil (combination of the silica fiber and the buffer coating), by loading the gel with solid or hollow microspheres.

Loading the gel with particles (preferably of silica but other particles are available) has several advantageous effects in addition to modifying the specific gravity. The low thermal coefficient of expansion of the silica (or similar particle material) reduces the overall bulk thermal coefficient of expansion of the loaded gel without placing any physical strain on the coil. Loading the gel with up to 40% by volume of silica particles has been tried, and greater loading can be practical. For example, a loaded gel having 50% by volume of silica particles reduces the thermal coefficient of expansion of the gel from about 300 ppm/deg C. to about 150 ppm/deg C. with a corresponding reduction in the effects associated with thermal changes.

The particles can be either hollow or solid, irregular or spherical, and the average size of the particles can vary. Typically, solid particles used as fillers range from 20–300 microns in diameter, but the particles can vary to average sizes outside this range. According to a book by Lee et al. entitled *The Handbook of Epoxy Resins,* McGraw-Hill, herein incorporated by reference, in the section entitled "Settling Properties of Fillers," the typical solid particles used as fillers for epoxy resins are those that pass through a 325 mesh sieve, which has an opening of 0.0017 inches (44 microns), and also common are particles that pass through a 200 mesh sieve, which has an opening of 0.0029 inches (74 microns). Table 14-2 of the book shows that solid particles having average sizes ranging from 0.015 microns to 2500 microns are used as fillers for epoxy resins. For example, quartz is used in average sizes up to 300 microns, but solid particles having sizes greater than 300 microns can settle very rapidly in the gel depending on the specific gravity of the particles. As such, maximum solid particle size of 300 microns or less is preferable. The settling properties of hollow particles are different than those of solid particles, and thereby hollow particles can have larger average sizes without settling.

The particles are preferably made of silica and remain suspended in the gel, but one particle cannot exert much force on others because the force would also react on the gel matrix which is very weak. Moreover, if the particles can exert too much force on each other, the force could propagate through the gel matrix to adversely affect the coil. This could become a problem when the loading is sufficiently high to form clumps of particles.

Furthermore, recognizing that the differential thermal coefficient of expansion of the gel and the coil housing can cause unwanted material flows, it can be desirable to make them as equal as possible. This could be achieved by making the housing from a plastic material or other similar material. As this is unlikely to have the exact thermal coefficient of expansion of the gel, the particle loading could be used to adjust the gel thermal coefficient for best performance.

Another advantage of loading the gel with particles involves increasing the gel viscosity. This is a known effect in gels, but the benefit is that the gel acts as an improved vibration damper. For instance, the gel has been qualitatively observed to quiver or vibrate when stimulated by a mechanical input, but the amplitude of this vibration decreases markedly when the gel is loaded with particles. Consequently, the vibration damping effect of the loaded gel reduces the potential amplification of vibrating inputs.

The viscous or Coulomb damping can also serve to reduce the input of high frequency vibrations from the environment to the Sagnac ring. As such, the gyro designer will have another degree of control over the performance of the gyro. In some situations, the presence of high frequency vibration inputs can overload the signal processing electronics. This arises as the angular rate increases proportional to frequency for a constant angular displacement.

An additional advantage of loading the gel with the particles is that the bulk thermal conductivity of the gel can be modified. The change in thermal properties can be controlled by adjusting the volumetric ratio loadings as well as the ratio of solid to microballoon particles. Lowering the thermal conductivity can be significant in controlling time-dependent thermal gradient effects.

Alternatively, in another embodiment of the present invention, the gel viscosity can also be increased by dispersion of particles with diameters of a micron or less. Only about a 5% loading of micron sized particles into the gel would be required to achieve a very viscous gel. Such a loaded gel permits the control of the vibrational effects but has little impact on the thermal properties of the gel. Loading the gel, however, with particles having diameters of a micron or less at the volumetric proportions described above for larger particles would make the gel too viscous to pour. Depending on the specific engineering problem being addressed, the alternatives for modifying the gel properties can be combined, thereby loading the gel with particles of a micron or less at lower volumetric proportions to increase gel viscosity together with the larger sized particles (solid, microballoons or both) at higher volumetric proportions to vary the thermal and specific gravity properties of the gel.

Additionally, the particle loading will increase the bulk modulus, increasing both the transverse and rotary natural frequencies of the ring and gel as a spring mass system. Thus additional design flexibility will be achieved by being able to modify the mechanical properties of the overall system.

Figure 5:
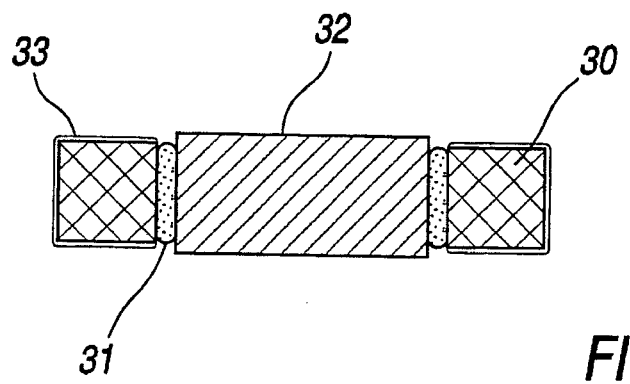
FIG. 5 is a vertical section of a modified sensing coil mounting assembly embodying the present invention.
Figure 6:
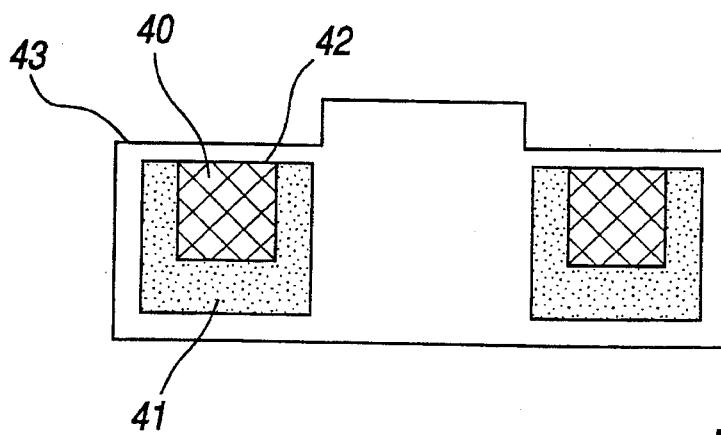
FIG. 6 is a vertical section of another modified sensing coil mounting assembly embodying the present invention.

In a modified embodiment of the invention illustrated in FIG. 5, an optical fiber coil 30 is wound on a layer of gel 31 on the surface of a rigid cylindrical form 32. The gel 31 is the same type of gel used in the embodiment of FIGS. 1–4 and prevents the direct application of forces from the rigid form to the coil 30. The outer surfaces of the coil 30 are coated with an adhesive 33 to hold the multiple windings of the coil together in a stable configuration. Alternatively, FIG. 6 shows another modified embodiment of the invention having a gyroscope configuration in which the coil 40 rests on a mounting surface 42 within the housing 43, but the coil 40 is otherwise surrounded by the gel 41. The mounting surface can be integral with, resting against, or connected to the housing 43. Another embodiment can have the mounting surface as separate from the housing and otherwise surrounded by the gel.

Although the invention has been illustrated in the drawings as utilizing a circular coil, it should be understood that the coil may have other geometric shapes, such as elliptical or rectangular. Furthermore, the particles for loading the gel have been described as silica particles, but other suitable materials can be utilized. Moreover, the particles have been described as hollow or solid, but the particles can be porous or contain multiple hollow chambers. The particle sizes have been specifically mentioned as being one micron or less for adjusting gel viscosity and having typical average sizes ranging between 20 and 300 microns. The particles loaded into the gel of the present invention, however, can also include particles of less than 20 microns in size, and particles of greater than 300 microns in size. Additionally, the particles loaded within the gel can include particles of substantially the same size or particles of various sizes. Finally, the present invention includes a loaded gel with a combination of various particle types having different characteristics (i.e. material, size, internal characteristics) suitable to control the different properties of the gel.

We claim:

1. A fiber optic gyroscope having a sensing coil of optical fiber submerged in a gel that surrounds and supports the sensing coil and a rigid housing containing said gel with said sensing coil submerged therein, the walls of the rigid housing being spaced away from the coil with the intervening space between said sensing coil and the innermost housing walls being filled with said gel, said gel being loaded with particles to reduce stresses from acting on said sensing coil over a range of temperatures by adjusting a coefficient of thermal expansion for said gel to reduce the differential with the coefficient of thermal expansion for said rigid housing and to damp vibrations propagating through said gel by increasing gel viscosity.

2. The fiber optic gyroscope of claim 1 wherein said particles including particles having average sizes between 20 and 300 microns in diameter.

3. The fiber optic gyroscope of claim 1 wherein said particles including particles approximately 1 micron or less in diameter.

4. The fiber optic gyroscope of claim 1 wherein said particles including particles of one micron or less and particles having average sizes between 20 and 300 microns in diameter.

5. The fiber optic gyroscope of claim 1 wherein said particles being made of silica.

6. The fiber optic gyroscope of claim 1 wherein said particles including particles that are hollow.

7. The fiber optic gyroscope of claim 1 wherein said gel is bonded to the walls of said housing.

8. The fiber optic gyroscope of claim 1 wherein said housing being made of plastic.

9. The fiber optic gyroscope of claim 1 wherein said housing being made of metal.

10. A method of forming a fiber optic gyroscope, comprising the steps of:

positioning a sensing coil on a flat horizontal surface of a rigid housing, said surface being perpendicular to the desired axis of rotation of said sensing coil;

loading a gel with particles to adjust a coefficient of thermal expansion for said gel to reduce the differential with the coefficient of thermal expansion for said rigid housing and to increase a viscosity for said gel;

depositing said gel on said sensing coil to surround said sensing coil with said gel to reduce stresses from acting on said sensing coil over a range of temperatures and to damp vibrations propagating through said gel.

11. A fiber optic gyroscope comprising a sensing coil formed of optical fiber, a silicone gel that surrounds and supports said sensing coil, said gel having a Young's modulus that is substantially constant over the operating temperature range of the gyroscope and a glass transition temperature that is below the operating temperature range of said gyroscope; and a rigid housing containing said gel with said sensing coil submerged therein, walls of the housing being spaced away from the sensing coil with the intervening space between said sensing coil and the innermost housing walls being filled with said gel, said gel being loaded with particles to reduce stresses from acting on said sensing coil over a range of temperatures by adjusting a coefficient of thermal expansion for said gel to reduce the differential with the coefficient of thermal expansion for said rigid housing and to damp vibrations propagating through said gel by increasing gel viscosity.

12. The fiber optic gyroscope of claim 11 wherein said particles including particles having average sizes between 20 and 300 microns in diameter.

13. The fiber optic gyroscope of claim 11 wherein said particles including particles approximately 1 micron or less in diameter.

14. The fiber optic gyroscope of claim 11 wherein said particles including particles of 1 micron or less in diameter and particles having average sizes between 20 and 300 microns in diameter.

15. The fiber optic gyroscope of claim 11 wherein said particles being made of silica.

16. The fiber optic gyroscope of claim 11 wherein said particles including particles that are hollow.

17. The fiber optic gyroscope of claim 11 wherein said housing being made of plastic.

18. The fiber optic gyroscope of claim 11 wherein said housing being made of metal.

19. A fiber optic gyroscope comprising a sensing coil wound around a form, said sensing coil submerged in a gel that surrounds and supports the sensing coil and a rigid housing containing said gel with said sensing coil submerged therein, the walls of the rigid housing being spaced away from the coil with the intervening space between said sensing coil and the innermost housing walls being filled with said gel, said gel being loaded with particles to reduce stresses from acting on said sensing coil over a range of temperatures by adjusting a coefficient of thermal expansion for said gel to reduce the differential with the coefficient of thermal expansion for said rigid housing and to damp vibrations propagating through said gel by increasing gel viscosity.

20. The fiber optic gyroscope of claim 19 wherein said gel is bonded to the walls of said housing.

21. The fiber optic gyroscope of claim 19 wherein said particles including particles having average sizes between 20 microns and 300 microns in diameter.

22. The fiber optic gyroscope of claim 19 wherein said particles including particles of 1 micron in diameter or less.

23. The fiber optic gyroscope of claim 19 wherein said particles including particles ranging from 1 micron in diameter or less and particles having average sizes between 20 microns and 300 microns in diameter.

24. The fiber optic gyroscope of claim 19 wherein said particles being made of silica.

25. The fiber optic gyroscope of claim 19 wherein said particles including particles that are hollow.

26. The fiber optic gyroscope of claim 19 wherein said housing being made of plastic.

27. The fiber optic gyroscope of claim 19 wherein said housing being made of metal.

28. A fiber optic gyroscope having a sensing coil of optical fiber submerged in a gel that surrounds and supports the sensing coil and a rigid housing containing said gel with said sensing coil submerged therein, the walls of the rigid housing being spaced away from the coil with the intervening space between said sensing coil and the innermost housing walls being filled with said gel, said gel being loaded with particles to reduce stresses from acting on said sensing coil by adjusting a spring mass of a combination including said gel and said sensing coil to produce a desired resonant frequency for said combination.

29. The optical fiber gyroscope of claim 28 wherein said particles increase the viscosity of said gel to further reduce stresses on said sensing coil by damping vibrations propagating through said gel.

30. A method of forming a fiber optic gyroscope, comprising the steps of:

positioning a sensing coil on a flat horizontal surface of a rigid housing, said surface being perpendicular to the desired axis of rotation of said sensing coil;

loading a gel with particles to adjust the specific gravity of said gel which reduces the differential with the specific gravity of said sensing coil to adjust the resonant frequency of a spring mass system including said gel and said sensing coil;

depositing said gel on said sensing coil to surround and support said sensing coil.

31. The method of forming a fiber optic gyroscope of claim 30 wherein said step of loading increases the viscosity of said gel to further reduces stresses on said sensing coil by damping vibrations propagating through said gel.

32. A fiber optic gyroscope having a sensing coil of optical fiber submerged in a gel, which is loaded with particles, that surrounds and supports said sensing coil and a directional coupler and a polarizer connected to said sensing coil, said directional coupler and said polarizer also being submerged in and supported by said gel.

* * * * *